Patented May 12, 1931

1,804,463

UNITED STATES PATENT OFFICE

ALBERT N. ERICKSON, OF ELMHURST, NEW YORK

FREEZING POINT LOWERING COMPOSITION

No Drawing.   Application filed November 7, 1925. Serial No. 67,697.

This invention relates to compositions for use in automobile cooling systems in cold weather to prevent freezing, and has for its principal object to provide an inexpensive composition which is readily soluble in water, is capable of greatly reducing the freezing temperature of water, forms a very fluid solution, is not corrosive nor otherwise injurious to the interior of the cooling system, and does not tend to creep up around the radiator cap and the heat indicating instrument customarily mounted on the cap.

Many attempts have been made heretofore to provide a suitable composition for lowering the freezing point of radiator water, but the compositions produced for the purpose have been subject to various objections, among which may be cited prohibitive cost, rapid evaporation, corrosive effect upon the cooling system, electrolytic activity in the cooling system, and viscosity of the cooling solution which resulted in slow circulation of the solution and clogging of the system.

Various salts and mixtures of salts have been tried, but such of these as were really effective for lowering the freezing point have been impractical because of their corrosive action or for some other reason.

I have found by experiment that a solution consisting principally of certain nitrates, such as sodium nitrate, is very effective to lower the freezing point and produces no corrosive action whatever in the cooling system. The introduction of sodium nitrate into the cooling system serves, in fact, as a preservative of the metallic parts of the system. This property is thought to be due to the formation of a thin, tenacious, impervious film of oxide upon the interior metallic walls of the cooling system which protects the walls from direct contact with cooling water, thus preventing any electrolytic or chemical action in the system.

This nitrate is cheap, passes readily into solution in water, and in concentrated solution lowers the freezing point below 0° F. The solution formed by it is extremely fluid, circulating with substantially the same freedom as pure water through the cooling system.

Sodium nitrate, however, tends to creep out of a pure water solution up the walls of the radiator neck, and to form a deposit or incrustation on the neck, the cap, and the heat indicating instrument which is apt to cause the cap to stick, and to insulate the instrument somewhat, making it less responsive to the radiator heat.

I have found that by adding a very small amount of a colloidal substance, as glue, for example, to the solution this tendency of the sodium nitrate to creep is entirely overcome. The amount of glue necessary to be added to attain this result is so small that it does not substantially affect the fluidity of the cooling liquid and does not, therefore, impede the circulation of the liquid through the cooling system.

An example of a composition which I have found to be highly efficient and wholly satisfactory consists of Sodium nitrate_____ 98–99%
Glue _____ 1– 2%

These ingredients may be dissolved in substantially the proportion stated and the solution sold to the automobile owner, or a mixture of the glue and nitrate in the stated proportion may be sold in solid form with directions for dissolving and using it.

It should be understood that sodium nitrate is given simply by way of illustration, and that other nitrates, or mixtures of this and other nitrates, may be employed as found desirable; also that these nitrates, or one of them, may be used with other freezing point lowering substances within the scope of my invention, so long as the nitrates are used in sufficient quantity to prevent corrosion in the cooling system.

Similarly other colloids than glue may be used to overcome creeping of the sodium nitrate, an example of a colloid capable of achieving this result being the substance commercially known as "Lignol."

Calcium nitrate is somewhat different in its action from sodium nitrate, in that it is more effective to lower the freezing point, and has no tendency to creep out of solution. It does, however, set up a slight reaction in the cooling system when first introduced therein. This reaction occurs for only a short time and then ceases, probably due to the formation of a tenacious protective coating on the metallic parts. I have found that even this slight reaction may be avoided by introducing a small quantity of a chromate in which the chromium has a valence of 6, into the composition. A composition which I have found suitable consists of

| | |
|---|---|
| $Ca(NO_3)_2$ | 99% |
| $Na_2Cr_2O_7$ | 1% |

Having described my invention, I claim:

1. A freezing point lowering composition for automobile cooling systems, consisting of non-corrosive nitrate and a colloid.

2. A freezing point lowering composition for automobile cooling systems, comprising a corrosion-resisting nitrate and a small quantity of glue.

3. A freezing point lowering composition for automobile cooling systems, comprising a non-corrosive, freezing point lowering nitrate, and an ingredient for preventing creeping of the salt.

4. A freezing point lowering composition for automobile cooling systems, comprising a nitrate and glue.

5. A freezing point lowering composition for automobile cooling systems, comprising soluble nitrate and a colloid in the ratio of substantially 99 to 1.

6. The method of lowering the freezing point of the cooling water in a motor cooling system, which consists in adding thereto an ingredient, consisting principally of soluble nitrate, in sufficient proportion to lower the freezing point substantially below the freezing point of water.

7. The method of lowering the freezing point of the cooling water in a motor cooling system, which consists in adding thereto an ingredient, consisting principally of calcium nitrate, in sufficient proportion to lower the freezing point substantially below the freezing point of water.

In testimony whereof I have affixed my signature to this specification.

ALBERT N. ERICKSON.